(12) United States Patent
Burt et al.

(10) Patent No.: US 7,304,268 B2
(45) Date of Patent: Dec. 4, 2007

(54) METHOD FOR RATING STICK ELECTRODES FOR PIPE WELDING

(75) Inventors: Randall M. Burt, Mentor, OH (US); Craig B. Dallam, University Heights, OH (US); Robert J. Weaver, Concord, OH (US)

(73) Assignee: Lincoln Global, Inc., City of Industry, CA (US)

( * ) Notice: Subject to any disclaimer, the term of this patent is extended or adjusted under 35 U.S.C. 154(b) by 169 days.

(21) Appl. No.: 11/355,552

(22) Filed: Feb. 16, 2006

(65) Prior Publication Data

US 2007/0187375 A1    Aug. 16, 2007

(51) Int. Cl.
  *B23K 9/095*  (2006.01)
(52) U.S. Cl. .............. 219/130.01; 219/137 R; 228/103
(58) Field of Classification Search ........... 219/130.01, 219/137 R; 228/103
  See application file for complete search history.

(56) References Cited

U.S. PATENT DOCUMENTS

| | | |
|---|---|---|
| 5,676,857 A | 10/1997 | Parker |
| 5,961,863 A | 10/1999 | Stava |
| 5,981,906 A | 11/1999 | Parker |
| 6,093,906 A | 7/2000 | Nicholson et al. |
| 6,703,585 B2 * | 3/2004 | Suzuki .................. 219/130.01 |
| 6,730,875 B2 | 5/2004 | Hsu |

* cited by examiner

*Primary Examiner*—Clifford C. Shaw
(74) *Attorney, Agent, or Firm*—Fay Sharpe LLP

(57) ABSTRACT

Stick welding electrode rating and ranking procedures are provided for determining stackability performance of stick electrodes for pipe welding operations. The rating technique involves performance of a standardized vertical down weld procedure using a stick electrode to form a weld bead in a test workpiece groove, in which the electrode is maintained during welding at a substantially constant angle relative to the workpiece groove. The electrode is advanced toward the groove at a slow speed to deposit molten metal in the groove while keeping the molten metal above the stick electrode end or the arc thereof without dripping. The resulting bead distance is measured along with the welding time and the stick electrode is rated according to a ratio of the weld time and the bead distance.

23 Claims, 8 Drawing Sheets

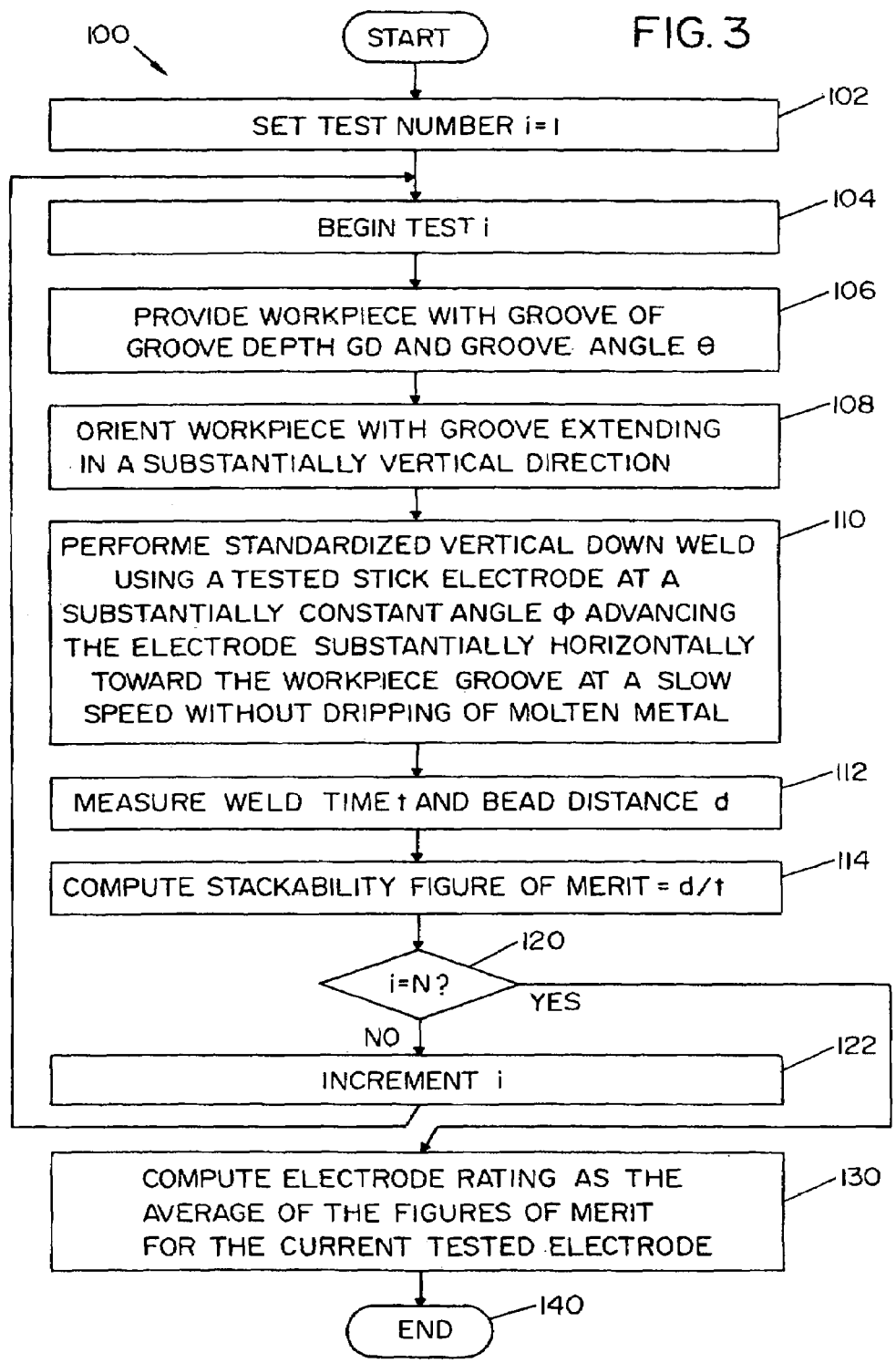

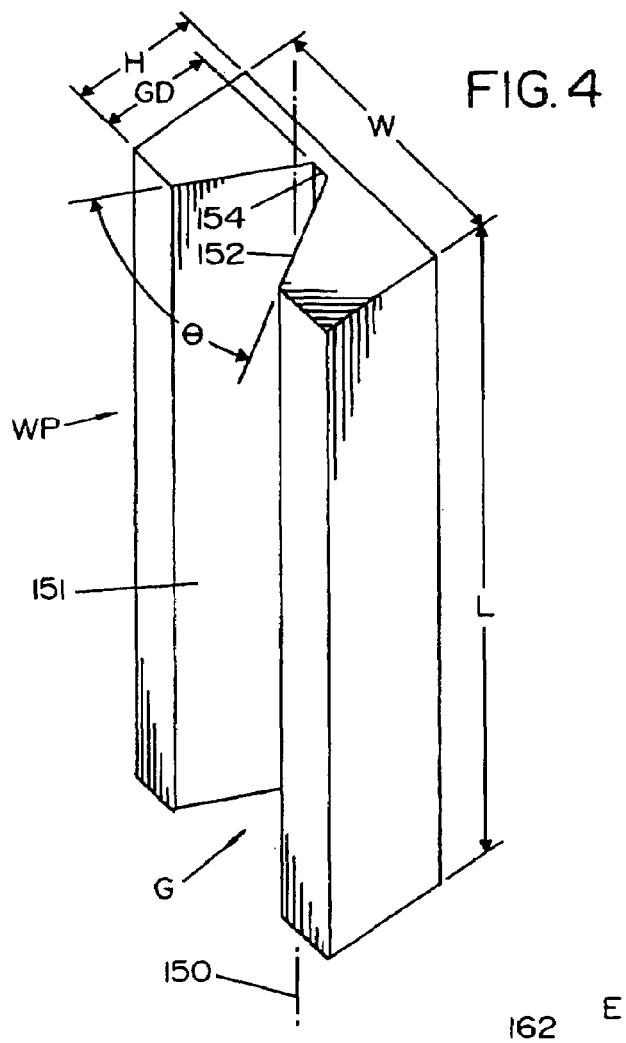
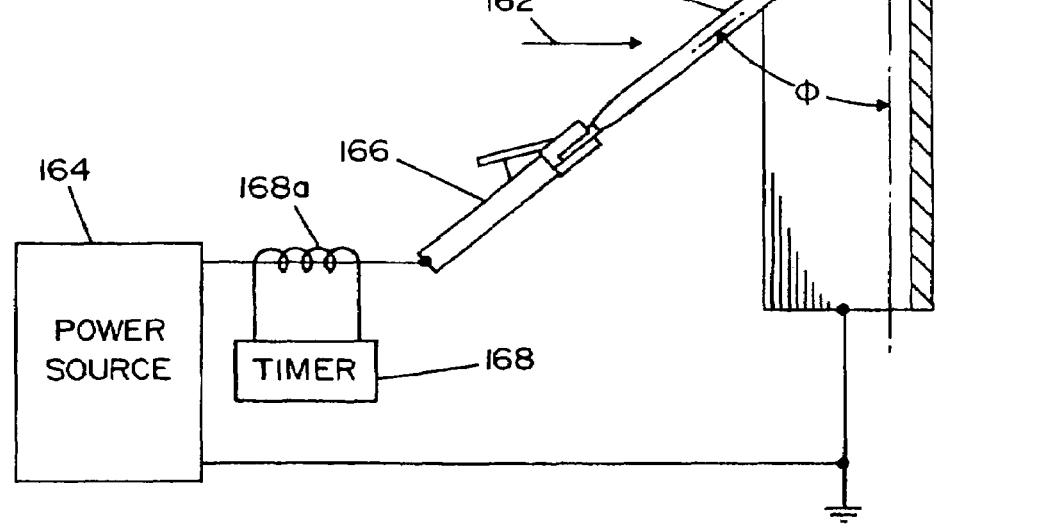
FIG. 4
FIG. 5

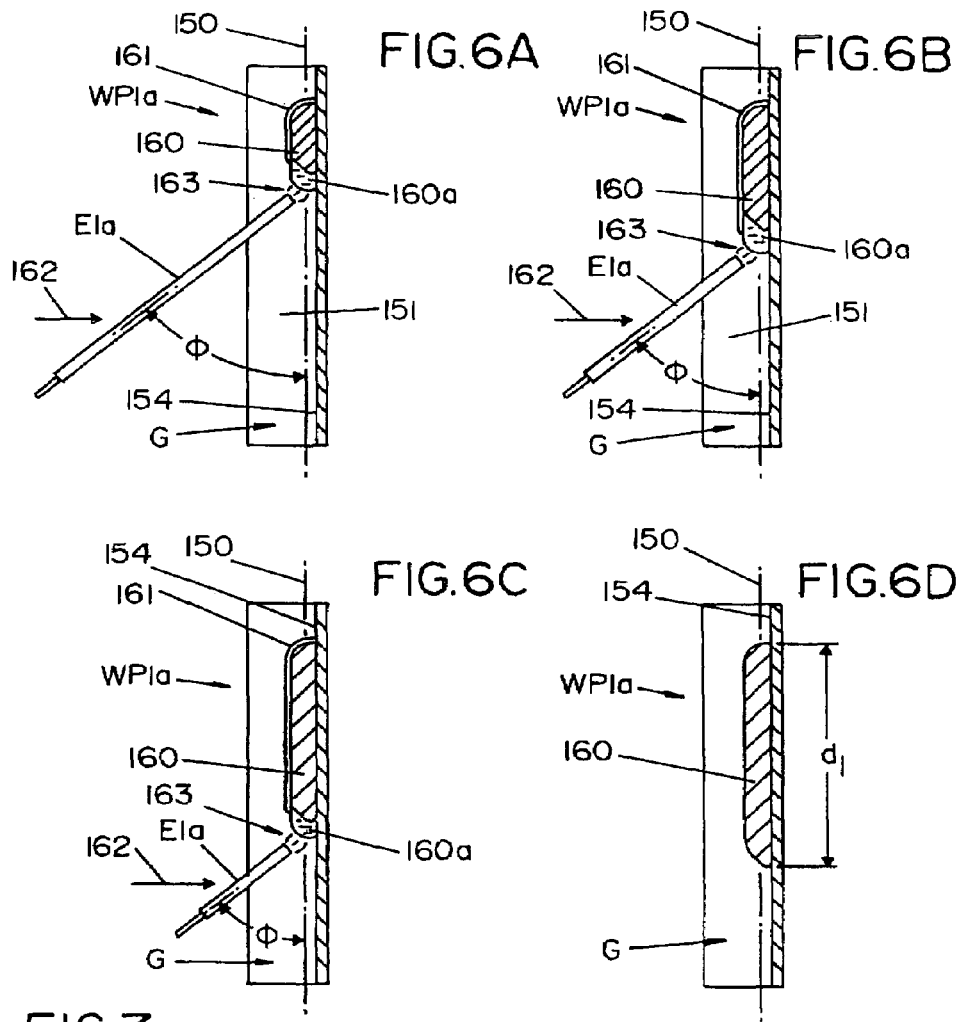

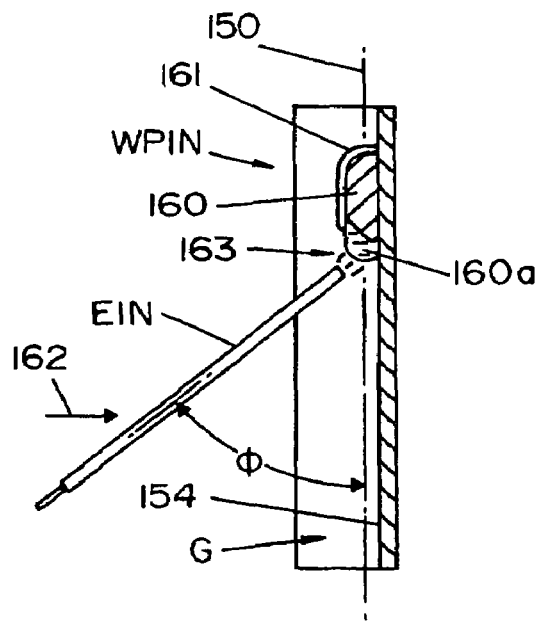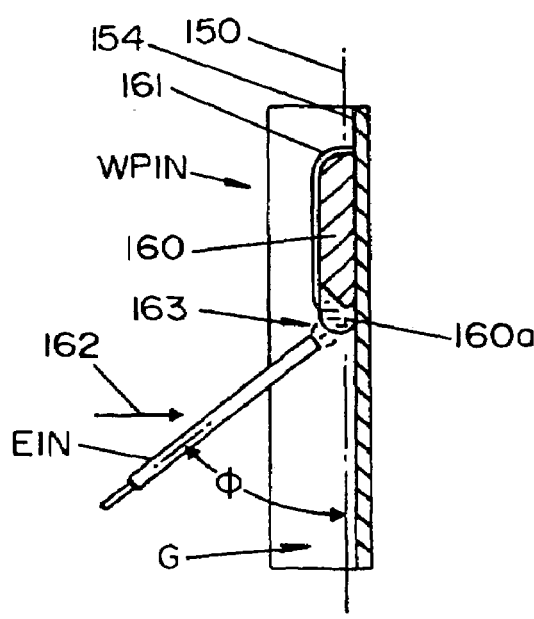
FIG.9AFIG.9B
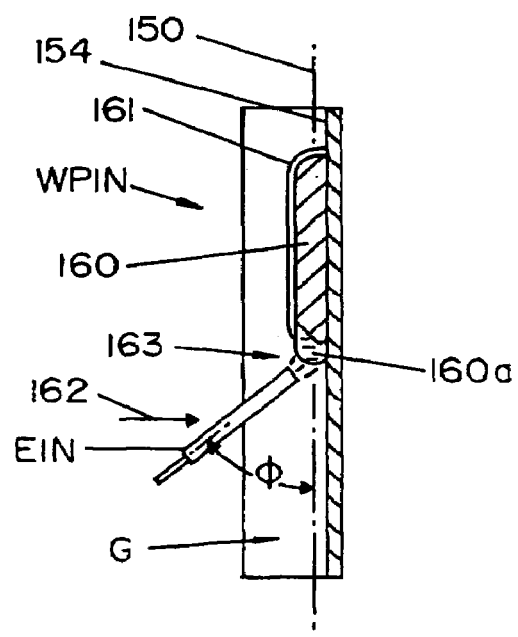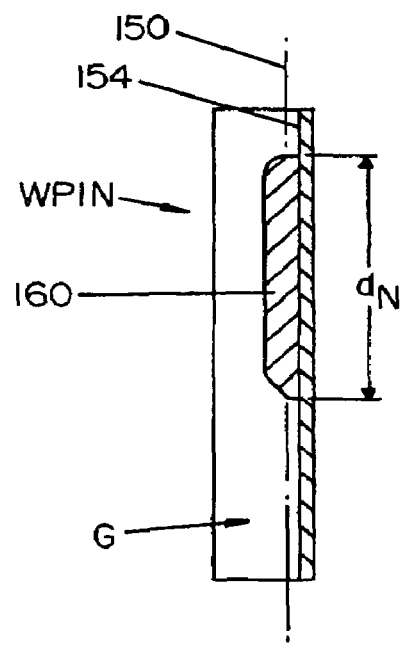
FIG.9CFIG.9D

METHOD FOR RATING STICK ELECTRODES FOR PIPE WELDING

FIELD OF THE INVENTION

The present invention relates generally to arc welding, and more particularly to methods for determining stackability ratings for pipe welding stick electrodes.

BACKGROUND OF THE INVENTION

Pipe welding involves joining the longitudinal ends of generally cylindrical pipe sections to form an elongated pipeline structure with an interior suitable for transporting gases or liquids. Automated pipe welding techniques are sometimes employed, such as the use of welding apparatus having two welding bugs which continuously move on a track around the periphery of the pipe to form the root bead, as shown in Parker U.S. Pat. No. 5,676,857. However, manual stick welding remains the primary technique used in welding pipe sections together to form pipelines, wherein cellulosic and vertical down low hydrogen stick electrodes are commonly employed for these applications. FIGS. 1 and 2A-2E show two pipe sections 1 and 2 being welded together for constructing a pipeline 10, wherein ends 1a and 2a of the sections 1 and 2 are welded together using conventional stick welding procedures. As best shown in FIG. 2A, the ends 1a, 2a are each machined to provide an outwardly facing external bevel 3 and a narrow flat land 4. The pipe sections 1 and 2 are then positioned in axial alignment with the ends 1a, 2a proximate one another using some form of clamping arrangement (not shown) in a closely spaced relationship to provide a narrow gap of length 5 between the two lands 4 with the beveled surfaces 3 forming a weld groove 6 having a groove angle 7, typically about 60 degrees. In practice, the ends 1a, 2a may initially be brought into contact with one another, and then the pipe sections 1 and 2 are carefully separated to provide the desired gap distance 5. As shown in FIG. 2B, the pipe ends 1a and 2a are then joined using an initial root pass to form a root bead 8 to fill the gap between the land edges 4. After the root pass, one or more stick weld filler passes are performed in FIGS. 2C-2E using a stick electrode 9 connected to a source of electrical welding current (not shown) to form a welding arc 15 between the electrode 9 and the pipe material. FIG. 2C illustrates a first filler pass in which a first filler bead or weld layer 11 is created, after which second, third, and fourth filler welds 12, 13, and 14, respectively, are created in similar fashion using stick welding (FIGS. 2D and 2E) to fill the groove 6, where the number of fill passes varies with the pipe thickness. A cap pass weld is then formed just prior to the weld being flush with the outer surface of the pipe so that the weld metal following the cap pass is at least flush with the outer surfaces of the pipe sections 1 and 2.

As shown in FIG. 1, the filler welds are performed in two operations, each beginning at the top of the joined pipe sections and proceeding down and around in the directions shown by arrows 16. The welding position varies in each fill pass from down-hand welding, to vertical down welding, and eventually to overhead welding as the fill pass proceeds around each half of the pipe joint circumference. Because the stick welding operation leaves residual slag over each filler pass, a time consuming cleaning operation is required to remove the slag by brushing, chipping, chiseling, and/or other cleaning steps before proceeding with the next filler pass. It is therefore desirable to reduce the number of filler passes required for completely filling the grove at the pipe section ends to reduce the time needed to weld each new pipe section added to the pipeline 10. In this regard, stick electrode selection is an important consideration in pipe welding, where some stick electrodes allow slower welding and hence more material deposition per unit length in each fill pass than others for a given set of welding parameters (welding current, groove dimensions, pipe material, etc.). The volume of weld material that can be deposited in a given groove per unit length of joint in a single stick welding pass is sometimes referred to as stackability. Stick electrodes having good stackability performance allow the use of fewer filler passes for a given pipe size and weld groove size, wherein stackability performance may vary widely among stick welding electrodes from different manufacturers. Consequently, there is a need for techniques by which the stackability performance of a stick electrode can be quantified to facilitate informed selection of electrodes for pipe welding operations.

SUMMARY OF INVENTION

A summary of one or more aspects of the invention is now presented in order to facilitate a basic understanding thereof, wherein this summary is not an extensive overview of the invention, and is intended neither to identify certain elements of the invention, nor to delineate the scope of the invention. Rather, the primary purpose of the summary is to present some concepts of the invention in a simplified form prior to the more detailed description that is presented hereinafter.

The present invention relates to stick welding electrode rating and ranking techniques by which individual stick welding electrodes can be objectively evaluated and different stick electrodes can be compared with respect to stackability performance. A controlled, repeatable, standardized vertical down stick weld is performed to create a weld bead in a test workpiece groove, during which the electrode is maintained at a substantially constant angle relative to the workpiece and advanced toward the groove at a slow speed to stack melted metal from the electrode into the groove while keeping the molten metal above the stick electrode without dripping. The tested electrode is then rated according to the resulting linear bead distance and the welding time. The methodologies of the invention may be advantageously employed to identify the best available stick welding electrode to minimize the number of filler passes for a particular pipe welding operation, thereby reducing the amount of time spent filling the pipe joint groove and performing slag removal between filler passes. The invention also finds utility in providing objective ranking of two or more different stick welding electrode types or brands, by which a determination can be made as to the relative quality with respect to stackability to allow informed selection of the best stick electrode for a pipe welding operation.

One aspect of the invention relates to a method for determining a stackability performance rating for a stick electrode for pipe welding operations. A workpiece is provided having a groove formed therein, and a standardized vertical down weld procedure is performed using a tested stick electrode to form a test weld bead having a bead distance in the groove. The weld procedure includes maintaining an axis of the stick electrode at a substantially constant angle (e.g., drag angle) relative to the axis of the workpiece groove, such as about 60 to 70 degrees in one example, while the electrode is advanced toward the groove. In addition, the stick electrode is advanced at a slow speed to deposit as much material as possible in the groove while avoiding dripping of molten metal during the weld. This controlled slow advancement of the stick electrode maximizes the amount of deposited material within a given length of the workpiece groove, wherein electrodes having superior stackability will allow deposition of more material in the groove per unit length than inferior electrodes. The welding time is measured during the standardized vertical down welding, and the length or distance of the finished weld bead is measured. A rating is then determined for the tested stick electrode according to the weld time and the bead distance, such as by computing a stackability figure of merit as the ratio of the bead distance divided by the weld time. The test may be repeated a number of times, such as five times in one example, using the same type of stick electrode, the same standardized vertical down weld procedure with the same workpiece groove dimensions, stick electrode angle, and power source settings (e.g., welding current, etc.), with the weld time and bead distance being measured for each test. In this case, the electrode is rated by averaging the distance to time ratios of the individual tests.

Another aspect of the invention provides a method for ranking two different stick electrodes according to stackability performance. The method includes providing a first workpiece with a groove, and performing a standardized vertical down weld procedure using a first stick electrode at a substantially constant angle, in which the electrode is advanced slowly toward the groove to form a first test weld bead having a first bead distance. The weld time and resulting bead distance are measured, and a first rating is determined for the first electrode according to the first weld time and the first bead distance, such as a ratio thereof. A second, substantially identical, workpiece is provided having a second groove and the standardized vertical down weld procedure is performed using a second stick electrode. The method further comprises measuring a second weld time and bead distance, and determining a rating for the second stick electrode, such as the ratio of the bead distance divided by the second weld time, and the first and second stick electrodes are ranked according to the first and second ratings.

BRIEF DESCRIPTION OF THE DRAWINGS

The following description and drawings set forth certain illustrative implementations of the invention in detail, which are indicative of several exemplary ways in which the principles of the invention may be carried out. Other objects, advantages and novel features of the invention will become apparent from the following detailed description of the invention when considered in conjunction with the drawings, in which:

FIG. 3 is a flow diagram illustrating an exemplary method of determining a stackability performance rating for a stick electrode in accordance with one or more aspects of the present invention;

FIG. 4 is a perspective view illustrating an exemplary test workpiece with a groove of a given groove depth and a groove angle, that may be used in implementing one or more methods according to the invention;

FIG. 5 is a partial schematic diagram illustrating a welding power source with a timer circuit for measuring weld times in performing a standardized vertical down welding procedure in the methods of the invention;

FIGS. 6A-6D are partial side elevation views in section illustrating creation of a test weld bead at various different times in a standardized vertical down stick welding procedure in which an axis of a first stick electrode is maintained at a substantially constant angle relative to a vertical workpiece groove while advancing the electrode toward the groove at a slow speed to deposit molten metal without dripping of molten metal in accordance with the invention;

FIG. 7 illustrates an exemplary data table showing weld time and bead distance measurement results and a corresponding stackability figure of merit computed as the ratio of the weld time divided by the bead distance for a first test using the first stick welding electrode;

FIGS. 9A-9D are partial side elevation views in section illustrating creation of another test weld bead at various times during the standardized welding procedure to test another stick welding electrode that is substantially identical to those of FIGS. 6A-6D and 8A-8D;

DETAILED DESCRIPTION OF THE INVENTION

Figure 1:
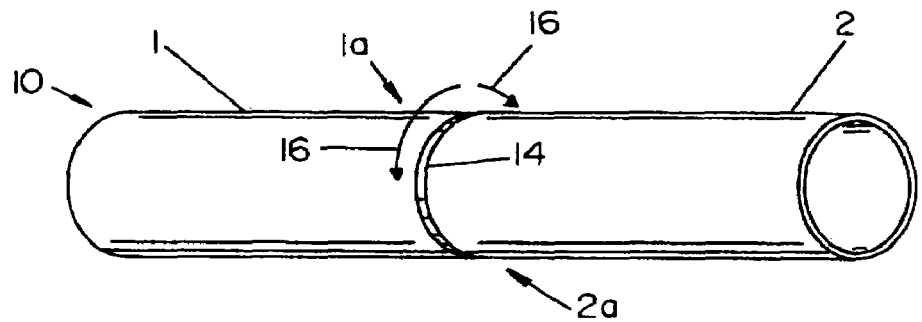
FIG. 1 is a partial perspective view illustrating fabrication of a pipeline by stick welding the ends of adjacent pipes sections.

One or more embodiments or implementations of the present invention are hereinafter described in conjunction with the drawings, wherein like reference numerals are used to refer to like elements throughout and wherein the illustrated structures are not necessarily drawn to scale. The invention relates to characterizing or rating stick welding electrodes with respect to stackability performance, and may be employed in rating or ranking any type of stick welding electrodes. The invention may be employed in any situation in which an objective stackability rating is desired for an individual type or brand of stick electrode, or where a relative ranking is needed to differentiate two different stick electrodes with regard to stackability. In particular, the invention may be advantageously employed in making informed decisions on which type or brand of stick electrode is the best choice for a particular pipe welding application in order to minimize or reduce the number of filler passes needed for pipe welding each new pipe section added to a pipeline.

Referring to FIGS. 3-7, a method 100 is illustrated in FIG. 3 for rating a stick electrode with regard to stackability in accordance with the invention. The methods of the invention may involve testing a single electrode to determine a stackability rating, or multiple tests may be performed for a single stick electrode type, brand, etc., with the results being used to determine a single rating for the electrode. In this regard, the exemplary method 100 of FIG. 3 illustrates performing an integer number N tests, where N is any positive integer, such as 5 in one implementation, to determine a stackability rating for a given stick electrode type or brand. Furthermore, the method 100 or other methods of the invention may be employed for comparing or ranking two or more stick welding electrode types with respect to stackability in an objective manner to facilitate choosing between competing electrode brands or manufacturers, or in selecting from among two or more available electrodes for a given stick welding application. Although the exemplary method 100 and other methods of the invention are illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Moreover, the methods of the invention may be carried out in conjunction with various electrodes, welding systems and apparatus, and workpieces illustrated and described herein, as well as in association with other structures that are not illustrated or specifically discussed.

As shown in FIG. 3, the method 100 begins with a test number or loop counter "i" being set to "1" at 102. The method 100 then enters a loop in which one or more tests are performed, depending on the value of an integer variable N. The methods of the invention may be automated or may be performed manually, as in the examples described herein. At 104, the first test begins (i=1 at this point) with provision of a first workpiece at 106. FIG. 4 illustrates one possible suitable workpiece WP that may be used in performing the methods of the invention, having a generally elongated rectangular form with a length L of about 18 inches, a width W of about 3 inches and a height H of about ½ inch, as well as a groove G extending generally along a longitudinal groove axis 150, where the groove G may be of any profile, preferably providing a U or V shaped channel with sidewalls 151 and 152 extending from a first surface into the workpiece WP to a groove bottom surface 154 to form the groove G with a groove depth GD of about ⅜ inch in the illustrated example.

Figure 2A:
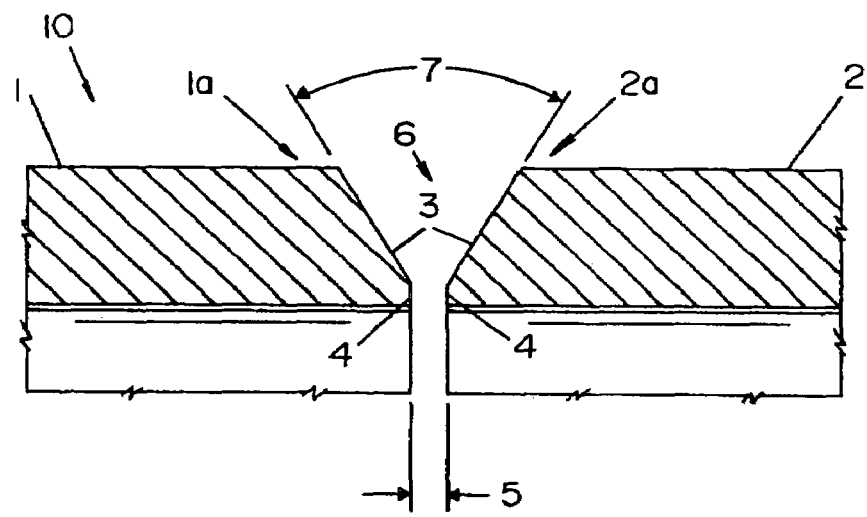
FIGS. 2A-2E are partial side elevation views in section illustrating machined pipe section ends being joined by performing a root pass weld and subsequent filler weld passes using stick welding procedures to fill a groove between beveled surfaces of the pipe section ends.
Figure 2B:
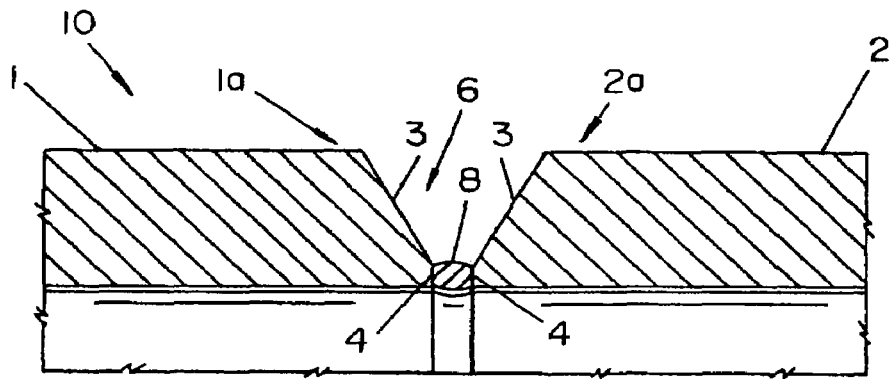
Figure 2C:
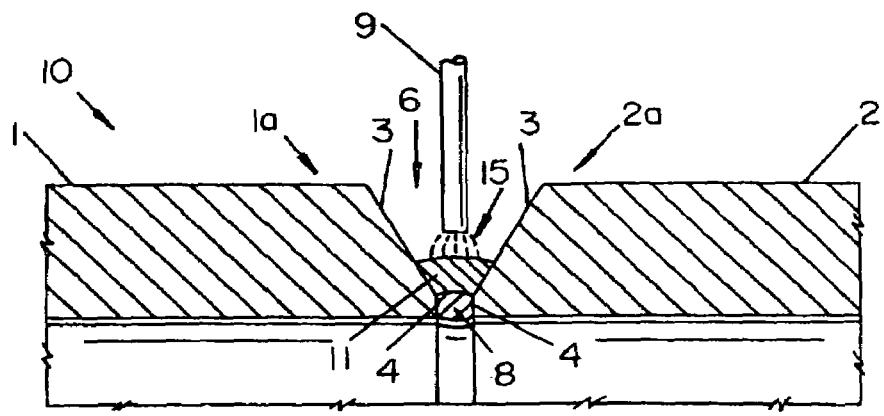
Figure 2D:
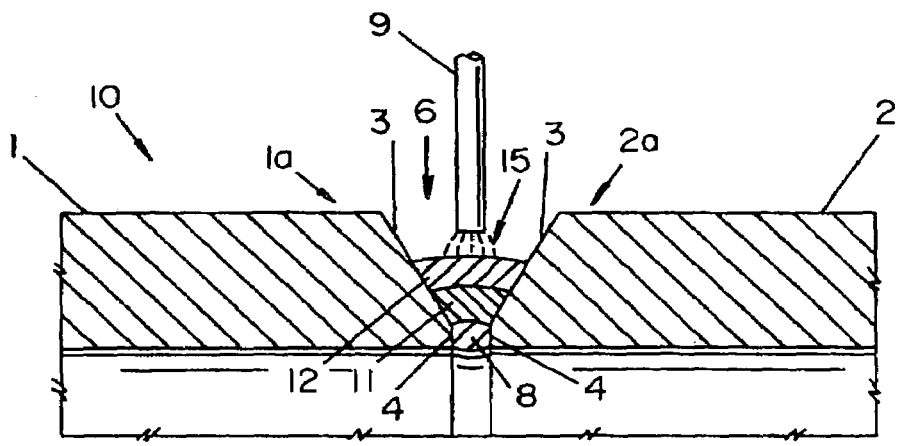

In the illustrated workpiece WP, the groove walls 151 and 152 provide a groove angle θ, which may be any suitable angle, such as about 60 degrees in the illustrated implementation, where the groove depth GD, angle θ, and one or more dimensions of the workpiece groove G may be tailored to match or emulate those of a particular pipe welding application of interest, although this is not a requirement of the invention. The groove G, moreover, extends along a generally straight groove axis 150, although other workpiece structures may be used, for example, including but not limited to those having grooves extending along curvilinear paths, and workpieces that are not strictly straight or are of different profiles or shapes. In the case of the illustrated workpiece WP of FIG. 4, the generally flat groove bottom surface 154 roughly approximates an initial root bead and a subsequent hot pass formed in a gap between machined pipe ends being joined in a pipe weld (e.g., root bead 8 in FIG. 2B above), with the test workpiece groove dimensions and angled sidewalls 151, 152 emulating the profile of a typical pipe weld joint undergoing an initial filler pass weld. However, this situation is not a requirement of the invention. The test workpiece WP is oriented generally upright at 108 with the groove G extending vertically for creating a test weld or weld bead 160 in the groove G, as best shown in FIG. 5, wherein a first test workpiece is indicated as WP1a in the drawings. In the illustrated example, the groove axis 150 of the workpiece WP1a is vertical, although other substantially vertical orientations of the groove G are possible within the scope of the invention, for example, within about five degrees of vertical. In addition, the test workpiece WP1a is preferably at room temperature prior to welding; however, if the workpiece WP1a is not at room temperature, it is preferable to perform the testing at a consistent temperature within a series of tests, although this is not a strict requirement of the invention.

At 110, a standardized vertical down weld procedure is performed using a first stick electrode E1a to form a test weld bead 160 having a bead distance $d_1$ in the groove G, as best illustrated in FIGS. 5 and 6A-6D. The stick electrode E1a is connected to a welding power source 164 (FIG. 5) via standard welding cables with a clamp 166 or other connection means to couple welding current to the electrode E1a, wherein the illustrated welding apparatus includes a timer 168 operable via a coil 168a to measure the weld time during which the power source 164 applies welding current to the electrode E1a. In one example, a generally constant current of about 170 amps is applied during the standardized welding procedure for 5 mm diameter tested electrodes, although any value of welding parameters may be used. In operation, the coil 168a provides a counter start signal when welding current is first applied such that counter 168 begins counting when the weld operation begins and ceases counting when the operation ends, whereby the counter 168 provides an indication of the amount of time during which a welding arc 163 is established between the stick electrode E1a and the workpiece WP1a.

Any standardized vertical down stick welding procedure can be employed within the scope of the invention in which the longitudinal axis of the stick electrode E1a is maintained at a substantially constant angle φ with respect to the groove axis 150 (e.g., drag angle for the vertical down weld) while the electrode E1a is advanced in a direction 162 (FIG. 5) toward the groove at a slow speed to stack melted metal 160a into the groove G above an end of the electrode E1a for a linear bead distance without allowing any of the molten metal 160a to drip below the end of the electrode E1a or the welding arc 163. The welding operation also provides welding flux from the electrode E1a which forms slag 161 over the weld bead, where the slag 161 preferably solidifies after solidification of the weld bead 160. The advancement of the electrode E1a may be substantially horizontal in one implementation, or alternatively an operator (not shown) may also translate the electrode E1a toward the groove G along the electrode axis itself, or combinations of axial advancement and horizontal advancement in direction 162, where any such implementation which provides for substantially constant angle φ is contemplated as falling within the scope of the invention and the appended claims. In this regard, the angle φ in one exemplary implementation is about 60 to 70 degrees and is maintained within about one or two degrees of a selected angle in that range during the welding procedure at 110.

FIG. 6A shows the process at a point where an initial amount of weld bead 160 has been formed with the molten material 160a being maintained above the end of the electrode E1a and above the welding arc 163 as the electrode E1a is slowly moved in the direction 162 while maintaining the angle φ between the groove axis 150 and the axis of the electrode E1a constant. The process is continued as shown in FIGS. 6B and 6C with further portions of the stick electrode E1a being consumed in forming the weld bead 160 and the molten weld material 160a. The electrode E1a is translated in the direction 162 at a slow speed, preferably at the slowest possible speed while avoiding metal dripping, thereby providing the maximum amount of deposited weld material 160 in a given distance within the stackability capabilities of the tested stick electrode E1a. In this regard, the inventors have appreciated that inferior stick electrodes will require a higher minimum translation speed than superior electrodes with respect to stackability in order to avoid dripping of molten material 160a.

The weld procedure can be carried out at 110 for any length of time and may provide a resulting weld bead 160 of any distance or length within the scope of the invention. In one example, the welding is stopped when a minimum of about six inches of weld bead 160 have been created in the groove G, although any suitable weld distance (e.g., run out length) may be created that allows determination of stackability performance for a stick electrode, such as about one or two inches or more. The operation may be continued to consume most of the electrode E1a or may otherwise be stopped when a sufficient bead length has been reached. As shown in FIG. 6D, once the welding is complete, the resulting weld bead 160 has a bead length or distance $d_1$. The weld time "t" is measured (e.g., $t_1$ for the first test) and the bead distance "d" is measured at 112 (distance $d_1$ in FIG. 6D) for the first test using any suitable length measurement technique and apparatus. The weld time is measured at 112 in the method 100 using the timer 168, or the weld time can be alternatively be ascertained by other means at 112.

At 114, a stackability performance measure or figure of merit is computed according to the measured weld time and bead distance. In the illustrated implementation, the figure of merit is computed as the ratio of the bead distance to the weld time (e.g., $d_1$ divided by $t_1$ for the first test). As shown in FIG. 7, the measurements and corresponding figure of merit may be entered into a table 170 for the first test. A determination is made at 120 as to whether an integer number "N" tests have been performed for the tested electrode type or brand. In the illustrated example, N=5, although any suitable number N can be used, where N is a positive integer. If N=1, however, the electrode E1a is rated at 130 according to the figure of merit $d_1/t_1$ before the method 100 ends at 140. In this regard, the inventors have found that performing about 5 tests and averaging the stackability figures of merit provides sufficiently repeatable stackability ratings for a stick welding electrode without significant variance, wherein further tests may not be needed to arrive at a rating sufficiently accurate to differentiate different electrode types, brands, etc.

Figure 8A:
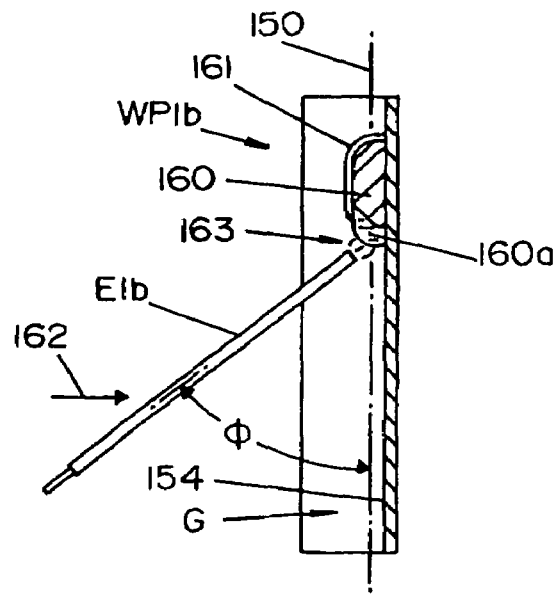
FIGS. 8A-8D are partial side elevation views in section illustrating creation of a second test weld bead at various different times in the standardized welding procedure to test a second stick welding electrode substantially identical to that of FIGS. 6A-6D.
Figure 8B:
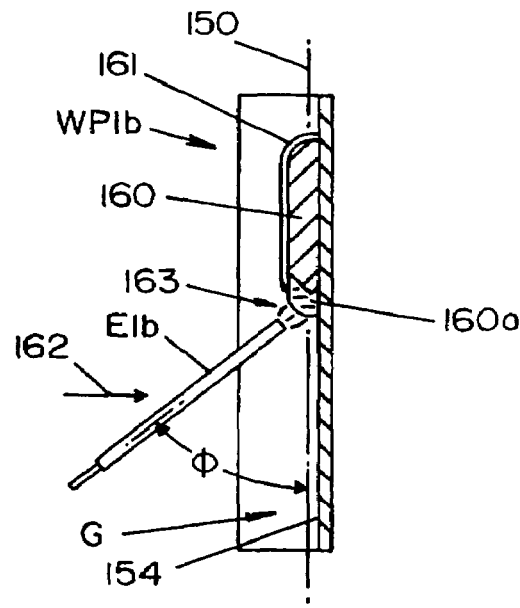
Figure 8C:
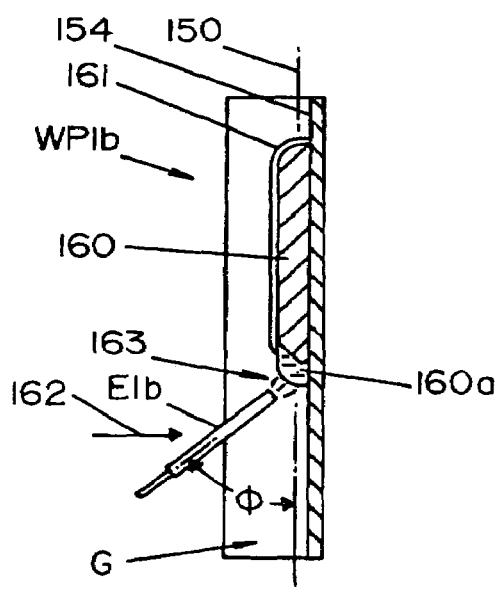
Figure 8D:
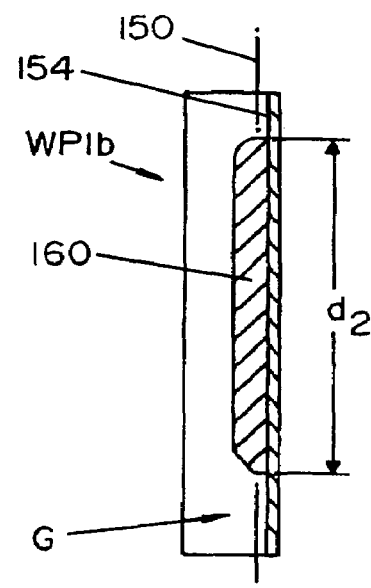
Figure 10:
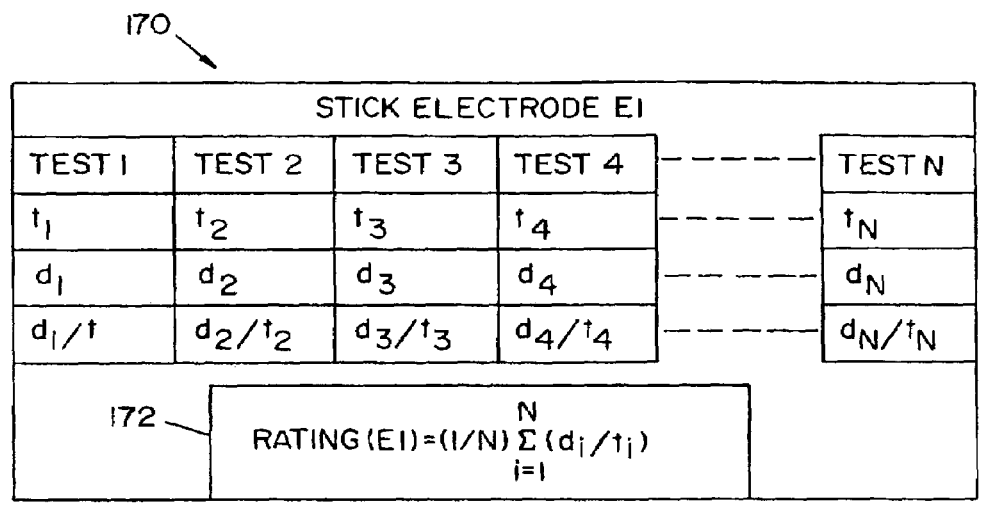
FIG. 10 illustrates the table of FIG. 7 including measurement data and computed figures of merit for an integer number N tests using substantially identical stick electrodes, along with a rating for the electrode computed as the average of the time to distance ratio figures of merit.

Referring also to FIGS. 8A-10, following the first test as described above, it is determined at 120 in FIG. 3 that N tests have not yet been performed (NO at 120), and the loop counted "i" is incremented at 122. The method 100 then repeats steps 104 through 120 for testing further substantially identical workpieces WP1b through WP1N using the same first electrode or other electrodes of the same type, brand, etc. As shown in FIGS. 8A-8D, a second workpiece WP1b is provided at 106 with generally identical dimensions and material as the first workpiece WP1a, and the second workpiece WP1b is positioned upright at 108 with the groove G thereof extending substantially vertically (e.g., groove axis 150 within a few degrees of vertical). A second substantially identical stick electrode E1b is then used at 110 in performing the standardized vertical down stick welding procedure, using the same drag angle φ with respect to the groove axis 150. As shown in FIGS. 8A-8C, the angle φ is held substantially constant while the electrode E1b is advanced in a direction 162 (e.g., and/or axially) toward the groove G at a slow speed to deposit molten metal 160a in the groove G above an end of the electrode E1b without allowing molten metal 160a to drip below the end of the electrode E1b or the welding arc 163. When finished, the resulting bead 160 has a measured bead distance $d_2$ as shown in FIG. 8D. The distance $d_2$ and the corresponding second weld time $t_2$ (e.g., measured using the timer 168 or other means) along with the corresponding figure of merit $d_2/t_2$ are then entered into a second column of the table 170, as shown in FIG. 10. This testing is then repeated (through steps 104-120 in FIG. 1) for each of the N substantially identical workpieces WP1, using substantially identical stick electrodes E1, wherein FIGS. 9A-9D illustrate the Nth test (e.g., the fifth such test in the case where N=5), with a test weld 160 being created in a workpiece WP1N using a stick electrode E1N and the standardized vertical down weld procedure (with the same electrode angle φ) to form a bead 160 (FIG. 9D) having bead distance $d_N$ (with the timer 168 providing the corresponding weld time $t_N$).

As shown in FIG. 10, the time and distance readings or measurement values t,d are entered into the table 170, with the individual figures of merit being computed as $d_i/t_i$ for i=1−N, and the rating 172 for the first electrode type is computed at 130 in FIG. 3 as the average of the figures of merit for the tested stick electrode E1. In the illustrated implementation, the stackability rating 172 is computed as an average of the distance to time ratios for the individual tests according to the following equation:

$$\text{RATING}(E1) = (1/N) \sum_{i=1}^{N} (d_i/t_i)$$

The inventors have appreciated that the resulting ratio of the stick weld distance d divided by the weld time t is indicative of the ease with which a stick welder can deposit a large amount of metal in a short distance, wherein lower stackability figure of merit ratios indicate better stackability and vice versa. In one possible alternative implementation, the figures of merit could be calculated as ratios of the times divided by the corresponding bead distances, in which case higher figure of merit ratios indicate better stackability and vice versa.

Figure 2E:
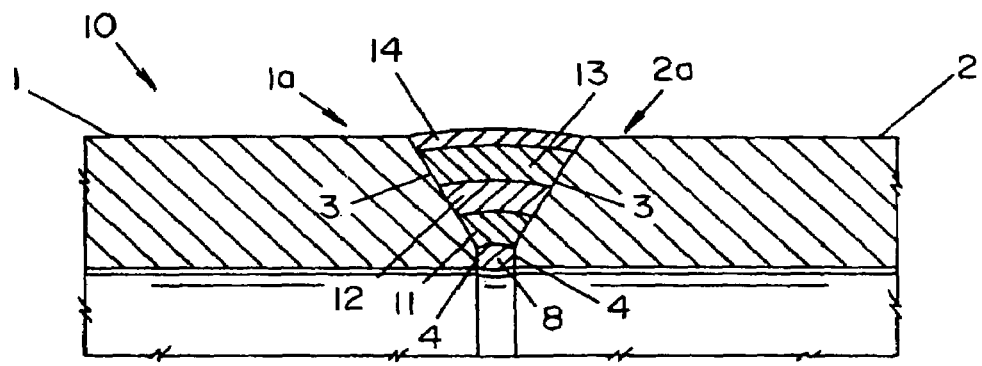
Figure 11A:
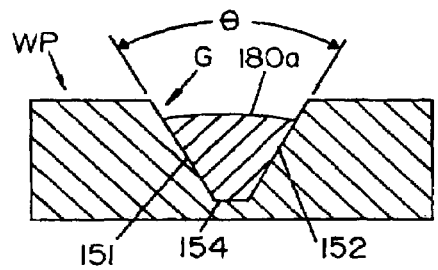
FIGS. 11A and 11B are partial side elevation views in section illustrating two exemplary test workpieces welded using the standardized vertical down welding procedure with two different types or brands of stick electrode, wherein a first electrode has superior stackability performance to the second electrode.
Figure 11B:
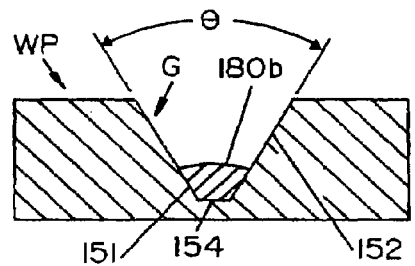
Figure 12A:
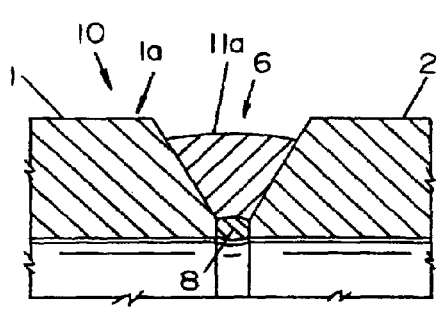
FIGS. 12A and 12B are partial side elevation views in section illustrating pipe section ends joined by stick welding following a first filler stick weld pass using two different stick electrode types or brands, in which a first electrode has superior stackability performance to the second electrode.
Figure 12B:
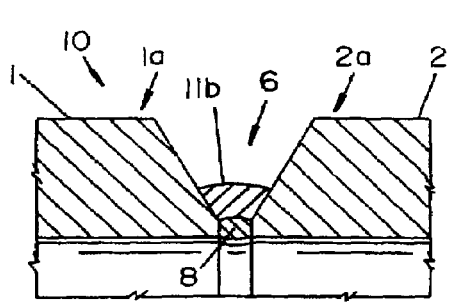

Referring now to FIGS. 11A-12B, the inventors have also appreciated that stick electrodes with good stackability performance will allow a pipe joint to be filled using fewer passes than with an electrode having poor stackability. This, in turn, facilitates reduction of total pipe welding time by eliminating one or more slag removal cleaning operations. FIGS. 11A and 11B show two workpieces WP having test weld beads 180a and 180b formed therein using a standardized vertical down stick welding procedure as described above, wherein the electrode used in forming the first bead 180a has better stackability performance than that used in forming the bead 180b in FIG. 11B, thereby resulting in greater volume of deposited material (thicker filler pass). The inventors, moreover, have appreciated that the stackability performance measured using the test workpieces WP with the standardized vertical down welding procedure can be correlated to fill stackability in welding cylindrical pipes, such as the pipe sections 1 and 2 used in forming the pipeline 10 in FIGS. 1-2E above. In this regard, FIGS. 12A and 12B illustrate the use of a stick electrode with good stackability performance (e.g., low stackability rating) and poor stackability (high rating), respectively. As shown in FIG. 12A, the use of a stick electrode having better stackability provides a relatively large amount of fill 11a in a single filler weld pass. Conversely, the use in FIG. 12B of a stick electrode with poor stackability provides a much smaller filler bead 11b.

Another aspect of the invention provides methods for ranking two or more different stick electrodes according to stackability performance. A first test workpiece is provided with a groove, and a standardized vertical down weld procedure is performed using a first stick electrode at a substantially constant angle, wherein the electrode is advanced slowly toward the groove to form a first test weld bead having a first bead distance, generally as described above. The weld time and bead distance are measured, and a first rating is determined for the first electrode according thereto, for example, by computing a ratio of the distance and time values. A second, substantially identical, workpiece is provided having a second groove and the standardized vertical down weld procedure is performed using a second (different) stick electrode. The second bead distance and weld time values are measured, and a rating is determined for the second stick electrode, such as the ratio of the bead distance divided by the second weld time, and the first and second stick electrodes are ranked according to the first and second ratings. In this manner, a number of competing electrode brands may be objectively ranked according to stackability performance, whereby an informed decision can be made as to the best stick electrode to employ for a given stick welding application, in particular pipe welding operations.

The invention has been illustrated and described with respect to one or more exemplary implementations or embodiments, although equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the illustrated implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

Having thus described the invention, the following is claimed:

1. A method of determining a stackability performance rating for a stick electrode for pipe welding operations, said method comprising: providing a workpiece having a groove formed therein along a groove axis to a groove depth with a corresponding groove angle; performing a standardized vertical down weld procedure using a stick electrode to form a test weld bead in said groove, said standardized vertical down weld procedure comprising maintaining an axis of said stick electrode at a substantially constant angle with respect to said groove axis while advancing said electrode toward said groove at a slow speed to stack melted metal from said electrode into said groove above an end of said electrode for a linear bead distance of said weld bead in said groove without allowing molten metal to drip below said end of said electrode; measuring a weld time of said weld procedure; measuring said linear bead distance; and determining a rating for said stick electrode according to said weld time and said bead distance.

2. A method as defined in claim 1, wherein determining a rating for said stick electrode comprises computing a stackability figure of merit as a ratio of said linear bead distance and said weld time, and wherein said stick electrode is rated according to said stackability figure of merit.

3. A method as defined in claim 2, wherein said workpiece is oriented during said weld procedure such that said groove extends in a substantially vertical direction.

4. A method as defined in claim 3, comprising providing an integer number N workpieces, N being an integer greater than 1, individual workpieces having a groove formed therein along a groove axis to a groove depth with a corresponding groove angle, wherein the grooves of said workpieces are substantially identical; performing said standardized vertical down weld procedure for each workpiece using substantially identical stick electrodes to form a test weld bead in the grooves of said workpieces; measuring a weld time of said weld procedure for each workpiece; measuring a linear bead distance of said test weld bead for each workpiece; and determining a rating for said stick electrode according to said weld times and said bead distances.

5. A method as defined in claim 4, wherein determining a rating for said stick electrode comprises computing figure of merit ratios of said linear bead distance and said weld time for each workpiece and computing a stackability rating as an average of said ratios.

6. A method as defined in claim 2, comprising providing an integer number N workpieces, N being an integer greater than 1, individual workpieces having a groove formed therein along a groove axis to a groove depth with a corresponding groove angle, wherein the grooves of said workpieces are substantially identical; performing said standardized vertical down weld procedure for each workpiece using substantially identical stick electrodes to form a test weld bead in the grooves of said workpieces; measuring a weld time of said weld procedure for each workpiece; measuring a linear bead distance of said test weld bead for each workpiece; and determining a rating for said stick electrode according to said weld times and said bead distances.

7. A method as defined in claim 6, wherein determining a rating for said stick electrode comprises computing figure of merit ratios of said linear bead distance and said weld time for each workpiece and computing a stackability rating as an average of said ratios.

8. A method as defined in claim 2, wherein said axis of said stick electrode is maintained at a substantially constant angle of about 60 to 70 degrees with respect to said groove axis while advancing said electrode toward said groove.

9. A method as defined in claim 1, wherein said workpiece is oriented during said weld procedure such that said groove extends in a substantially vertical direction.

10. A method as defined in claim 9, comprising providing an integer number N workpieces, N being an integer greater than 1, individual workpieces having a groove formed therein along a groove axis to a groove depth with a corresponding groove angle, wherein the grooves of said workpieces are substantially identical; performing said standardized vertical down weld procedure for each workpiece using substantially identical stick electrodes to form a test weld bead in the grooves of said workpieces; measuring a weld time of said weld procedure for each workpiece; measuring a linear bead distance of said test weld bead for each workpiece; and determining a rating for said stick electrode according to said weld times and said bead distances.

11. A method as defined in claim 10, wherein determining a rating for said stick electrode comprises computing figure of merit ratios of said linear bead distance and said weld time for each workpiece and computing a stackability rating as an average of said ratios.

12. A method as defined in claim 9, wherein said axis of said stick electrode is maintained at a substantially constant angle of about 60 to 70 degrees with respect to said groove axis while advancing said electrode toward said groove.

13. A method as defined in claim 1, comprising providing an integer number N workpieces, N being an integer greater than 1, individual workpieces having a groove formed therein along a groove axis to a groove depth with a corresponding groove angle, wherein the grooves of said workpieces are substantially identical; performing said standardized vertical down weld procedure for each workpiece using substantially identical stick electrodes to form a test weld bead in the grooves of said workpieces; measuring a weld time of said weld procedure for each workpiece; measuring a linear bead distance of said test weld bead for each workpiece; and determining a rating for said stick electrode according to said weld times and said bead distances.

14. A method as defined in claim 13, wherein determining a rating for said stick electrode comprises computing figure of merit ratios of linear said bead distance and said weld time for each workpiece and computing a stackability rating as an average of said ratios.

15. A method as defined in claim 13, wherein said axis of said stick electrode is maintained at a substantially constant angle of about 60 to 70 degrees with respect to said groove axis while advancing said electrode toward said groove.

16. A method as defined in claim 1, wherein said axis of said stick electrode is maintained at a substantially constant angle of about 60 to 70 degrees with respect to said groove axis while advancing said toward said groove.

17. A method as defined in claim 1, wherein said groove is substantially straight.

18. A method as defined in claim 1, wherein said standardized vertical down weld procedure comprises maintaining an axis of said stick electrode at said substantially constant angle with respect to said groove axis while advancing said electrode toward said groove at a slow speed to deposit molten metal in said groove above a welding arc without allowing molten metal to drip below said welding arc.

19. A method as defined in claim 1, wherein said electrode is advanced during said standardized vertical down weld procedure in a substantially horizontal direction toward said groove.

20. A method of ranking first and second stick electrodes with respect to stackability performance for pipe welding operations, said method comprising: providing a first workpiece having a first groove formed therein along a first groove axis to a groove depth with a corresponding groove angle; performing a standardized vertical down weld procedure using a first stick electrode to form a first test weld bead in said first groove of said first workpiece, said standardized vertical down weld procedure comprising maintaining an axis of said first stick electrode at a substantially constant angle with respect to said first groove axis while advancing said first stick electrode toward said first groove at a slow speed to stack melted metal from said electrode into said groove above an end of said electrode for a first linear bead distance of said first weld bead in said groove without allowing molten metal to drip below said end of said first stick electrode; measuring a first weld time of said weld procedure; measuring said first linear bead distance; determining a first rating for said first stick electrode according to said first weld time and said first linear bead distance; providing a second workpiece having a second groove of said groove angle formed therein along a second groove axis to said groove depth; performing said standardized vertical down weld procedure using a second stick electrode to form a second test weld bead having a second bead distance in said second groove of said second workpiece; measuring a second weld time of said weld procedure; measuring said second linear bead distance; determining a second rating for said second stick electrode according to said second weld time and said second linear bead distance; and ranking said first and second stick electrodes according to said first and second ratings.

21. A method as defined in claim 20, wherein determining a rating for said first stick electrode comprises computing a first stackability figure of merit as a ratio of said first bead distance and said first weld time, wherein said first stick electrode is rated according to said first stackability figure of merit, wherein determining a rating for said second stick electrode comprises computing a second stackability figure of merit as a ratio of said second bead distance and said second weld time, and wherein said second stick electrode is rated according to said second stackability figure of merit.

22. A method as defined in claim 20, wherein said workpieces are oriented such that said grooves extend in a substantially vertical direction during said weld procedure.

23. A method as defined in claim 20, wherein said axis of said stick electrodes are maintained at a substantially constant angle of about 60 to 70 degrees with respect to said groove axis during said welding procedure.

* * * * *